J. T. SKILLEN.
CHIMNEY THIMBLE.
APPLICATION FILED DEC. 30, 1912.
1,084,495.
Patented Jan. 13, 1914.
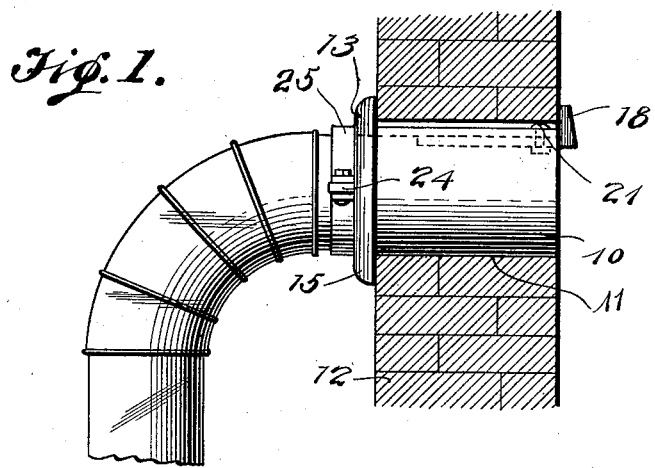
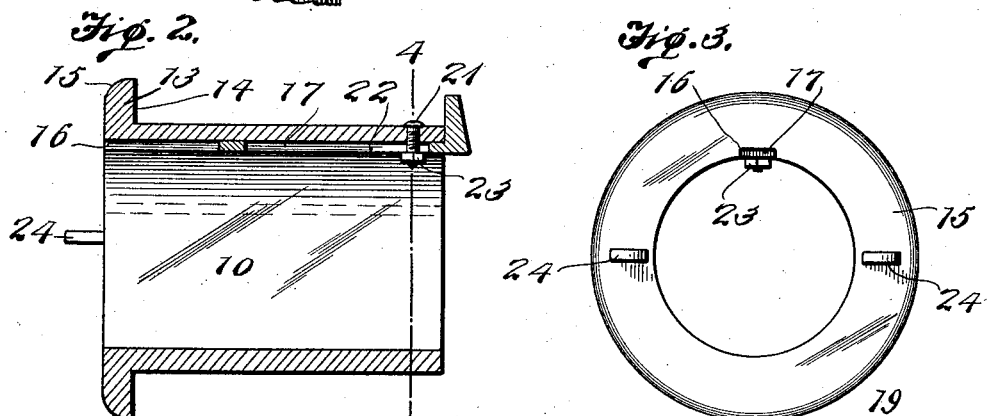
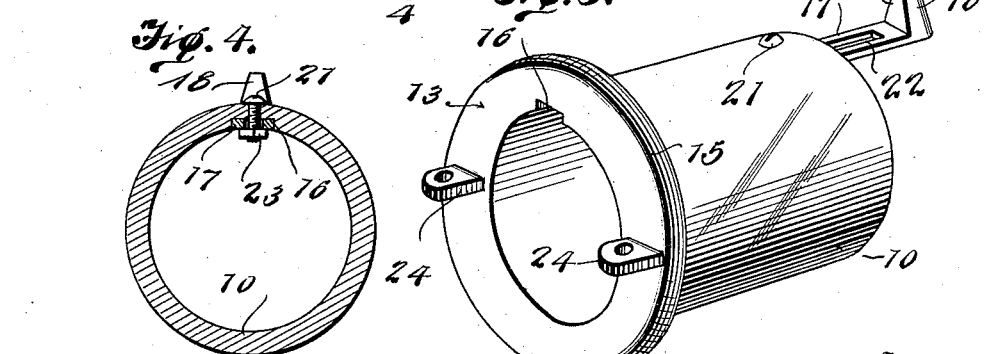
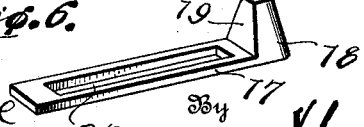
Inventor
J. T. Skillen

UNITED STATES PATENT OFFICE.

JAMES T. SKILLEN, OF CEDAR RAPIDS, IOWA.

CHIMNEY-THIMBLE.

1,084,495.  Specification of Letters Patent.  Patented Jan. 13, 1914.

Application filed December 30, 1912. Serial No. 739,421.

*To all whom it may concern:*

Be it known that I, JAMES T. SKILLEN, citizen of the United States, residing at Cedar Rapids, in the county of Linn and State of Iowa, have invented certain new and useful Improvements in Chimney-Thimbles, of which the following is a specification.

This invention relates to an improvement in stove pipe thimbles.

The primary object of the invention is to provide a thimble adapted to be inserted within the stove pipe opening in the chimney with means whereby the device may be retained against displacement and is adapted for walls of different thickness, the attaching means being readily adjustable to clamp the thimble securely in position.

A further object of the invention is to provide a construction which will support the stove pipe collar and which, while forming an effectual support, will present a neat appearance.

In the drawings: Figure 1 is a view showing the device attached to a chimney; Fig. 2 is a longitudinal sectional view of the thimble; Fig. 3 is an end elevation; Fig. 4 is a transverse section; Fig. 5 is a perspective view; and Fig. 6 is a detail view of the retaining member.

In the drawings, 10 designates a hollow cylindrical member which is disposed to extend within the stove pipe opening 11 of the wall 12. This member is formed with a flange 13, the face 14 of which is flat, its outer face 15 being rounded. When the member is inserted within the stove pipe opening, the flat face contacts with the wall 12. The cylindrical member is formed interiorly with a groove 16. A slotted bar arm 17 is arranged to slide in this groove. The arm 17 is provided with a projection 18 which extends at right angles to the arm, the face 19 of said projection being disposed to contact with the wall 12, and co-acts with the flange 13 to prevent movement of the thimble with respect to the wall. A bolt 21 passes through the cylindrical member and extends within the slot 22 of the arm 17, a nut 23 being threaded on the terminal of said bolt. This nut contacts with the sliding arm, the nut being tightened to lock the arm against movement. By this construction, it will be noted that the cylindrical member may be inserted within the stove pipe opening and the offset terminal of the arm brought in contact with the wall of the chimney, the nut 23 being tightened, and the flange 15 and the offset of the arm contacting with the inner and outer walls of the chimney respectively to prevent movement of the cylindrical member.

It will be noted that the thimble may be quickly positioned within the stove pipe opening and securely locked against accidental displacement, and that its removal may be accomplished in a simple and convenient manner. The flange 15 is formed with a plurality of diametrically disposed apertured ears 24 to which is secured the stove pipe clamp 25, the stove pipe in this manner being securely clamped to the thimble.

The many advantages of a construction of this character will be clearly apparent, as it will be noted that the device may be quickly assembled within the stove-pipe opening, and that it may accommodate itself to chimney walls which differ in thickness, the adjustment being secured in a simple and effective manner. It will also be noted that the construction is such that the device may be easily and economically manufactured, and the various parts may be readily assembled.

Having thus described my invention, what I claim as new and desire to secure by Letters Patent is:

A stove pipe thimble comprising a cylindrical member formed at one end with an annular flange and provided interiorly with a groove which opens through both ends of the member, a slotted arm slidably mounted in said groove, said arm being formed with a wall engaging extension, and means supported by the cylindrical member for locking the arm against movement with respect to the member.

In testimony whereof I affix my signature in presence of two witnesses.

JAMES T. SKILLEN. [L. S.]

Witnesses:
 JOHN BURIANEK, Jr.,
 CARL W. HUMMER.

---

Copies of this patent may be obtained for five cents each, by addressing the "Commissioner of Patents, Washington, D. C."